Aug. 8, 1933.   C. A. NICKLE   1,921,204
VOLTAGE COMPENSATED STARTING RELAY FOR SPLIT PHASE MOTORS
Filed April 14, 1930
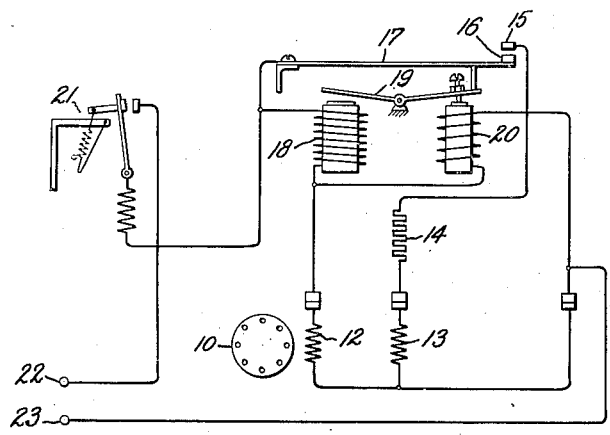
Inventor:
Clifford A. Nickle,
by Charles E. Tuller
His Attorney.

Patented Aug. 8, 1933

1,921,204

UNITED STATES PATENT OFFICE 1,921,204

VOLTAGE COMPENSATED STARTING RELAY FOR SPLIT PHASE MOTORS

Clifford A. Nickle, Schenectady, N. Y., assignor to General Electric Company, a Corporation of New York Application April 14, 1930. Serial No. 444,079
13 Claims. (Cl. 172—279)

My invention relates to motor controlling devices, more particularly to controlling devices for starting electrical motors of the split phase type.

In one system used for starting a split phase motor having a running winding and a starting winding a relay is placed in series with the running winding. When the switch is closed to place the motor across the line, the current flowing through the running winding energizes this relay which then places the starting winding across the line. This, of course, develops a starting torque and the motor then comes up to speed. As the motor comes up to speed the current flowing through the running winding is reduced until such a point is reached that the relay is no longer sufficiently energized to keep its contacts closed, at which point the contacts drop out and the starting winding becomes deenergized. The motor then runs as an induction motor as is well known in the art.

In practice various voltages are encountered. It can readily be appreciated that if the voltage is too low, the starting relay will fail to pick up. The current which then flows through the running winding, although it is insufficient to cause a protective device which is usually provided for such an emergency to operate, it is nevertheless sufficiently strong to cause damage to the motor windings which frequently results. In the case of high voltages, when the motor comes up to running speed, the current flowing through the relay is still strong enough to keep the relay closed and in this case it is necessary to weight the contacts of the relay in order that they will open when the motor comes up to speed. It will thus be seen that with the usual type of relay as used above, difficulty is experienced in an attempt to make the system operative over the wide range of voltages encountered.

It is, therefore, an object of my invention to provide means for starting a split phase motor over the wide range of voltages encountered in the usual installation.

It is a further object of my invention to provide a means operable over a wide range of voltages and which will deenergize the starting winding of a split phase motor when running speed has been reached.

These and other objects will appear hereinafter.

In the preferred embodiment of my invention, I provide a relay having two coils, one a current coil and the other a voltage coil the relay operating in response to a predetermined impedance of the running winding of a split phase motor during operation of the motor. These two coils are electrically balanced against each other and operate independently of the applied voltage. In the split phase motor a running winding and a starting winding are provided. The current coil of the relay is placed in series with the running winding of the motor and the voltage coil is placed in parallel with the running winding. The starting winding of the motor is normally open but is connected to a circuit closing device for placing the starting winding in parallel with the running winding to develop a starting torque. A means is provided for closing this circuit closing device and is controlled by the two coils. When the motor is placed across the line, the series coil is energized to close the circuit closing device, but as the motor comes up to speed, the current through the series coil decreases and this coil is overbalanced by the voltage coil which actuates the armature to open the circuit closing device at a predetermined speed.

Thus in case of low applied voltage, since the two coils are balanced, the reduced current in the current coil is sufficient to close the relay against the reduced pull of the voltage coil. Likewise, due to the balanced action when the motor reaches a predetermined speed the voltage coil will open the starting winding. In the case of high applied voltages, the current through the current coil is increased but the pull of the voltage coil is likewise increased, and hence the relay will again open at the proper time.

My invention will be better understood from the following description when considered in connection with the accompanying drawing and its scope will be pointed out in the appended claims. In the accompanying drawing, the figure represents the schematic diagram of my invention.

The split phase motor has a rotor 10 and is provided with a running winding 12 and the starting winding 13. In series with the starting winding is the resistor 14 for limiting the starting current. A circuit closing device for energizing the starting winding 13 is provided with an arm 17 which carries the contact 16 biased to the open position. The contact 16 cooperates with the contact 15 to complete a circuit through the starting winding 13. The series or current coil is designated by the numeral 18 and the voltage coil by the numeral 20. These two coils are electrically balanced against each other and operate the armature 19 which closes the contacts 16 and 15. The switch 21 is a well-known type of thermostatic switch used in connection with refrigerator apparatus and is used merely for the purpose of illustration since it is not necessary for the operation of my device. The supply lines are designated for the numerals 22 and 23.

The operation of my device is as follows: When the automatic switch 21 closes, it completes the circuit from the line 22, through the switch 21, series coil 18, running winding 12, back to the other side of the supply line 23. This causes a current to flow through the running winding 12 and the series coil 18 which under starting conditions, due to the high starting current, exerts a greater pull on the armature 19 than the voltage coil 20 which is also energized. The armature 19 is thus attracted to the electroresponsive coil 18 to close the contacts 15 and 16 which places the starting winding 13 across the line. This develops a starting torque to start the motor. As the motor comes up to speed, the current flowing through the running winding 12 and the series coil 18 is gradually reduced although the voltage across the voltage coil 20 is affected but little. Thus, with a decreasing magnetizing effect in the coil 18, the pull exerted by this electroresponsive coil gradually reduces to such a point that at a predetermined speed the pull exerted by the voltage coil overcomes the pull of the series coil and causes the armature 19 to assume its normal position and permit the biased member 17 to open the contacts 15 and 16. The coils 18 and 20 are electrically balanced so that they operate independently of the applied voltages over a wide range as pointed out above.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:

1. In combination, a split phase motor having a running winding and a starting winding, and an electro-responsive switch for controlling the energization of the starting winding responsively to the decrease in current in the running winding as the motor is started and having means for compensating for variations in the running winding current due to variations of the applied voltage.

2. In combination, a split phase motor having a running winding and a starting winding, a movable switch member for controlling the energization of the starting winding, and electro-magnetic means for controlling the switch member having one winding connected to be energized responsively to the current of the running winding and a second winding connected to be energized responsively to the voltage applied to the running winding.

3. In combination, a split phase motor provided with a starting winding and a running winding, circuit controlling means for providing a closed circuit through said starting winding to start the motor, an electroresponsive means in parallel with said running winding for opening the circuit closing means after the motor is started, and a second electroresponsive device in series with said running winding for rendering said first electroresponsive device inoperative to open said starting winding while the motor is being started.

4. In combination, a split phase motor having a running winding and a starting winding, a circuit controlling means for said starting winding for providing a closed circuit through said starting winding to start the motor, a movable armature for controlling said means, a pair of electromagnets electrically connected with the windings of the motor for controlling said movable armature, said movable armature being normally biased toward one of said electromagnets and movable toward the other of said electromagnets to actuate said circuit controlling means to close the circuit of the starting winding to start the motor, said one magnet acting to return said armature to its biased position after the motor is started to open the circuit through said starting winding.

5. In combination, a split phase motor having a running winding and a starting winding, a circuit controlling member for controlling the circuit through said starting winding, an electroresponsive device energized in accordance with an electrical characteristic of the motor on starting for controlling said movable member to start the motor, and an oppositely acting electroresponsive means energized in accordance with the voltage applied to said motor for controlling said movable member after the motor is started.

6. In combination, a split phase motor having a running winding and a starting winding, a switch for starting the motor, an independently operable circuit controlling member for the starting winding, a plurality of electroresponsive devices controlling said member, one of said devices being responsive to the motor current for obtaining a closed starting winding to start the motor, and another of said devices being responsive to the motor voltage for opposing said current responsive device to open said starting winding after the motor is started.

7. In a motor control circuit, a motor having a starting winding and a running winding, a pair of cooperating circuit controlling contacts biased to an open position and connected to close the circuit through the starting winding, an armature for closing said contacts, an electromagnet connected in series with the running winding for controlling the armature to effect energization of said starting winding to start the motor, a second electromagnet in parallel with said running winding for rendering said first electromagnet ineffective after said motor is started whereby said starting winding is deenergized.

8. In combination a split phase motor having a running winding and a starting winding, means for applying a voltage to the running winding, and means differentially dependent upon the current through the running winding and the voltage applied to the running winding for controlling energization of the starting winding.

9. In combination a split phase motor having a running winding and a starting winding, means differentially dependent upon the current in said running winding and the voltage applied to the running winding for energizing the starting winding to start the motor and deenergizing the starting winding after the motor is started.

10. In combination a split phase motor having a running winding and a starting winding, a circuit controlling device for controlling the circuit through the starting winding, electroresponsive means differentially responsive to the voltage applied to the running winding and the current in the running winding for opening said circuit controlling device after the motor is started and for holding said device closed while said motor is brought up to running speed.

11. In combination, a split phase motor provided with a running winding and a starting winding, means for applying voltage to said motor, and a relay operable between predetermined open and closed circuit positions for controlling the energization of said starting winding so as to disconnect said starting winding from said applied voltage after said motor attains a predetermined speed, said relay comprising a current coil connected in series circuit relation with one of said windings for biasing said relay to one of said positions, and a voltage coil connected across one of said windings for biasing said relay to said other position, said coils cooperating to insure the operation of said relay at said predetermined speed irrespective of variations in said applied voltage.

12. In combination, a split phase motor having a running winding and a starting winding, a line switch for applying voltage to said motor, a relay for controlling the energization of said starting winding so as to deenergize said starting winding as soon as said motor rotates at a predetermined speed, comprising an armature for said relay operable between open and closed circuit positions, a coil connected in series circuit relation with said running winding for biasing said armature to one of said positions, and a second coil connected in parallel circuit relation with one of said motor windings for operating said armature to the other of said positions to deenergize said starting winding as soon as said predetermined speed is reached irrespective of variations in said applied voltage.

13. In combination, a split phase motor having a running winding and a starting winding, a line switch for applying voltage to said motor, a relay for controlling the energization of said starting winding so as to deenergize said starting winding as soon as said motor rotates at a predetermined speed, comprising a movable contact for said relay operable between open and closed circuit positions, an armature for operating said contact, means for pivotally mounting said armature intermediate its ends, a current coil for said relay connected in series circuit relation with said running winding for biasing said armature for movement in one direction with respect to said pivot, and a voltage coil connected in parallel circuit relation with one of said motor windings for operating said armature in the opposite direction with respect to said pivot so as to insure the operation of said relay at said predetermined speed irrespective of variations in said applied voltage.

CLIFFORD A. NICKLE.